United States Patent [19]

Tsuge et al.

[11] Patent Number: 4,569,536
[45] Date of Patent: Feb. 11, 1986

[54] SEAT BELT SYSTEM

[76] Inventors: Noboru Tsuge, 27, Kamimatsu, Ogakie-cho, Kariya-shi, Aichi-ken; Masahiro Taguchi, 4, Aza Kidayu, Ooaza Okkawa, Kira-cho, Hazu-gun, Aichi-ken; Sadahisa Onimaru, 1, Sumizaki, Shimohasumi-cho, Nishio-shi, Aichi-ken; Satosi Kuwakado, 29-1, Aza Atoshiro, Ooaza Ashinoya, Kota-cho, Nukata-gun, Aichi-ken, all of Japan

[21] Appl. No.: 627,618

[22] Filed: Jul. 3, 1984

[30] Foreign Application Priority Data

Jul. 4, 1983 [JP] Japan .................. 58-120243

[51] Int. Cl.[4] ............................................. B60R 21/10
[52] U.S. Cl. .................................. 280/807; 180/268
[58] Field of Search ............... 280/802, 807, 801; 180/268; 128/693

[56] References Cited

U.S. PATENT DOCUMENTS

| 3,835,839 | 9/1974 | Brown | 128/693 |
| 3,838,746 | 10/1974 | Andres | 180/268 |
| 3,918,545 | 11/1975 | Andres et al. | 180/268 |
| 4,144,878 | 3/1979 | Wheeler | 128/693 |
| 4,209,075 | 6/1980 | Messina | 180/268 |
| 4,213,581 | 7/1980 | Andres et al. | 280/807 |
| 4,232,836 | 11/1980 | Fohl | 280/807 |

Primary Examiner—Joseph F. Peters, Jr.
Assistant Examiner—Ross Weaver

[57] ABSTRACT

A seat belt system including: a seat belt device including at least one seat belt and at least one seat belt drive device thereof; two electrodes; a heart beat calculating circuit for receiving signals detected at the electrodes and calculating a heart beat in response to signals from the electrodes; and a control circuit for outputting a control signal to the seat belt drive device to wind or unwind the seat belt in response to the heart beat signal from the heart beat calculating circuit.

8 Claims, 4 Drawing Figures

SEAT BELT SYSTEM

BACKGROUND OF THE INVENTION

1. Field of the Invention

The present invention relates to a seat belt system, more particularly to a automobile seat belt system which can automatically tighten and untighten the seat belts in accordance with the condition of the driver.

2. Description of the Prior Art

Seat belt systems are now standard equipment for automobiles in many countries. Conventional seat belt systems, of course, are designed only to protect the driver or passenger in the event of accidents and are powerless to prevent accidents due to a driver falling asleep at the wheel, drunken driving, etc.

On another matter, conventional seat belt systems include a seat belt and a seat belt winding device having a spring for winding up and removing belt slack. Due to this arrangement, the driver or passenger is continuously subjected to a fixed tension from the seat belt. This creates an unpleasant sensation and restricts freedom of motion, thereby often prompting detachment of the seat belt or even removal of the entire system.

SUMMARY OF THE INVENTION

An object of the present invention is to provide a seat belt system which can tighten a seat belt in response to conditions which might lead to accidents so as to give an effective warning to a driver.

Another object of the present invention is to provide a seat belt system which can eliminate unpleasant tension on the driver or passenger in use of the seat belt.

In accordance with the present invention, there is provided a seat belt system comprising: seat belt means including at least one seat belt and at least one seat belt drive device; two electrodes; heart beat calculating means for receiving signals detected at the electrodes and calculating a heart beat in response to signals from the electrodes; and a control circuit means for outputting a control signal to the seat belt drive device to wind or unwind the seat belt in response to the heart beat signal from the heart beat calculating means.

BRIEF DESCRIPTION OF THE DRAWINGS

Other objects and features of the present invention will be clearly understood from the following description with reference to the accompanying drawings, wherein.

DESCRIPTION OF THE PREFERRED EMBODIMENT

Embodiments of the present invention will be explained below with reference to the drawings.

Figure 1:
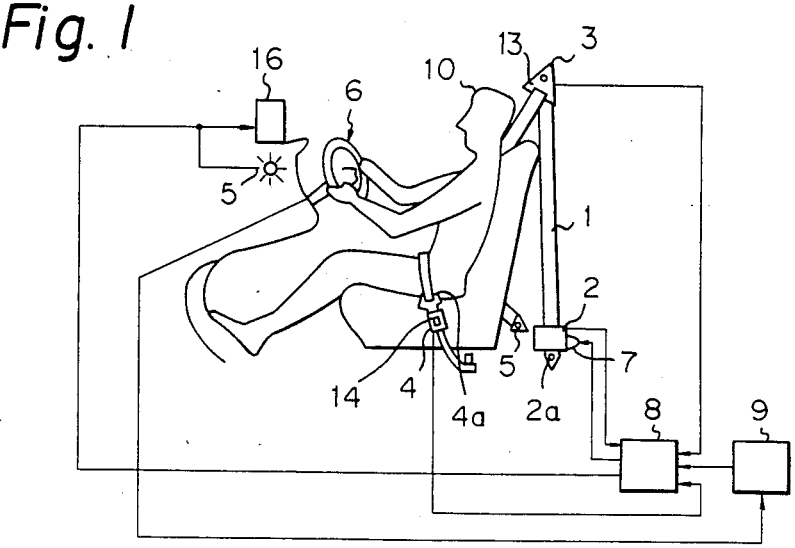
FIG. 1 is a block diagram of an automobile seat belt system in accordance with the present invention.

FIG. 1 is a block diagram of an embodiment of an automobile seat belt system in accordance with the present invention. The automobile seat belt system includes a seat belt 1, similar to a conventional one, and a belt winding device 2 fixed on the automobile body (not shown) by means of a bolt through a hole 2a. One end of the seat belt 1 is wound up in the belt winding device 2. The other end of the seat belt 1 passes through a hole of a slip joint 3 fixed on a automobile body and a hole of a tongue plate 4a, is turned back at the plate 4a, and finally terminates at an anchor plate 5 fixed on the automobile body. When the tip of the tongue plate 4a is inserted into a buckle 4, the seat belt 1 forms a continuous three-point seat belt means which safely holds a driver 10.

The automobile seat belt system also includes a motor 7 which drives the belt windup and a control circuit 8. The motor 7 drives a belt windup shaft (not shown) in the belt winding device 2 in response to a control signal from the control circuit 8.

Figure 2:
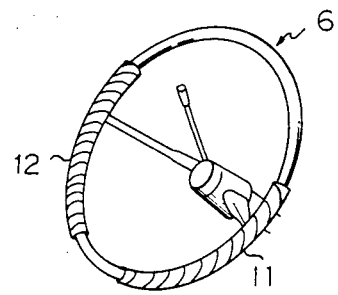
FIG. 2 is a perspective view of a steering wheel mounting two electrodes of the present invention.

The automobile seat belt system further includes two electrodes 11 and 12, a slack sensor 13 built into the slip joint 3, and a buckle sensor 14 built into the buckle 4. The electrodes 11 and 12 are mounted on a steering wheel 6 as shown in FIG. 2 and are electrically isolated from each other. In driving, the driver's hands touch the electrodes 11 and 12. Accordingly, the electrodes 11 and 12 form a heart potential detecting sensor. The operation of this sensor will be explained later in detail. The slack sensor 13 is a tension sensor and detects the slack of the seat belt 1. The slip joint 3 is installed to be rotation free and, accordingly, rotates up in the clockwise direction in FIG. 1 when the seat belt is slack. The slack sensor 13 detects this slack of tension. The buckle sensor 14 detects that the tip of the tongue plate 4a is inserted into the buckle 4 in a regular condition.

The operation of the seat belt system will be explained below.

Figure 3:
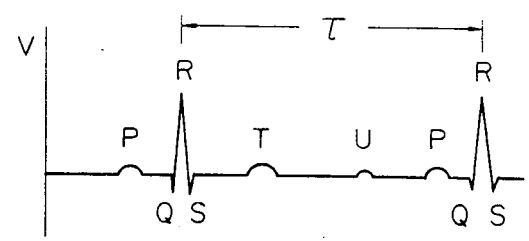
FIG. 3 is a waveform of a heart potential obtained by the electrodes shown in FIG. 2.

First, the principle of the detection of the heart potential will be explained with reference to FIGS. 2 and 3. When the driver touches the electrodes 11 and 12 on the steering wheel 6, a voltage difference arises between electrodes 11 and 12 in response to his heart potential. FIG. 3 is a standard heart potential curve with a time dependent. The heart potential includes P, QRS, T, U, and other pulses which appear consecutively and periodically. The relationship between the times of occurrence of these pulses, their waveforms, and their amplitudes indicate the driver's overall physical condition. For example, a long time span $\tau$ between the QRS pulses indicates the driver is asleep, while a short time span $\tau$ indicates he is in an excited state. The principle of this detection is similar to that of an electro-cardiograph, however, in the embodiment, the heart potential is obtained by electrodes on the steering wheel 6.

Figure 4:
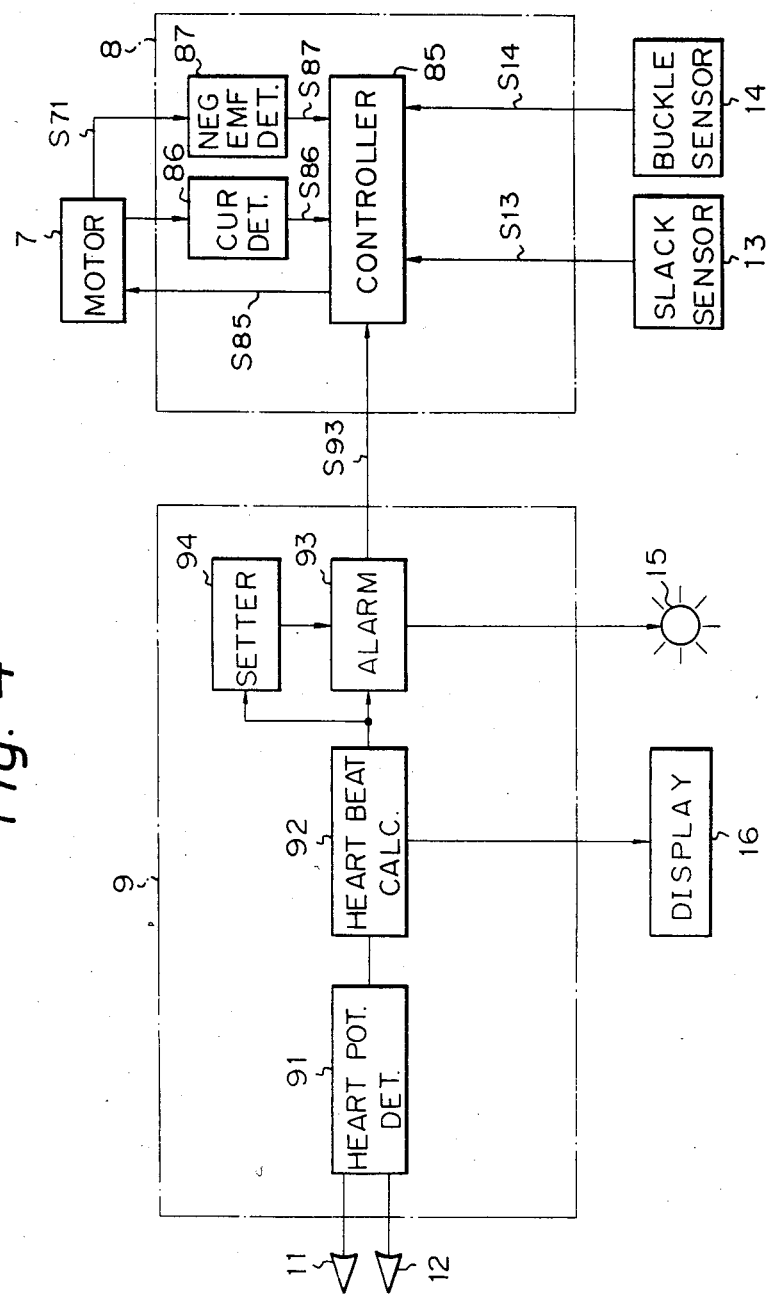
FIG. 4 is a schematic circuit diagram of a control circuit and heart beat measurement and alarm circuit.

FIG. 4 is a circuit diagram of a control circuit 8 and a heart beat measurement and alarm circuit 9.

The heart beat measurement and alarm circuit 9 includes a heart potential detecting circuit 91 and a heart beat calculating circuit 92. The heart potential detecting circuit 91 receives voltage signals from the electrodes 11 and 12, preferably through amplifiers (not shown) and noise elimination filters (not shown), and derives the difference of the potentials of the two to obtain a heart potential difference as shown in FIG. 3. The heart beat calculating circuit 92 receives an output signal from the heart potential detecting circuit 91 and calculates a heart beat in response to, for example, the time span between consecutive QRS pulses. The heart beat calculating circuit 92 calculates not only an instantaneous heart beat but also a simple average, a moving average, and a weighted average of the heart beat during a predetermined time, e.g., one minute, so as to obtain a precise heart beat signal. The heart beat signal obtained in the heart beat calculating circuit 9 is displayed on a display device 16, such as a two-digit numerical liquid crystal device mounted on the automobile instrumentation panel. By this, the driver can monitor his heart beat during normal driving and other situations.

The heart beat measurement and alarm circuit 9 further includes an alarm circuit 93 and a limit setting circuit 94. The limit setting circuit 94 receives the heart beat signal from the heart beat calculating circuit 92 during normal drive conditions and defines alarm levels, preferably consisting of an attention level, an alarm level, and an emergency level. The alarm setting signals defined by the limit setting circuit 94 are applied to the alarm circuit 93. The alarm circuit 93 compares a current heart beat signal from the heart beat calculating circuit 92 and the alarm setting signals and outputs an alarm signal to an alarm emission device 15 when the current heart beat signal exceeds any of the alarm setting signals. The alarm emission device 15 is also mounted on the automobile instrumentation panel and preferably is both visual and audio. The visual alarm may consist of a yellow lamp for attention, a red lamp for alarm, and a blinking red lamp for emergency. The audio alarm may consist of two or three different sounds. It will be noted that the alarm emission device 15 notifies the alarm status to not only the driver, but also his passengers.

In the above-mentioned embodiment, the alarm setting signals are automatically derived. However, the alarm setting signals can also be manually set by the driver in a well-known manner.

By the means mentioned above, it is possible to significantly improve automobile safety. In the present invention, automobile safety can be further improved by the control circuit 8 described below.

The control circuit 8 consists of a controller 85, a current detector 86, and a negative electromotive force (emf) detector 87. The current detector 86 senses a current of the motor 7. The emf detector senses a negative emf of the motor 7. The controller 85 receives an alarm signal S93 from the alarm circuit 93, a slack signal S13 from the slack sensor 13, and a buckle joint signal S14 from the buckle sensor 14 and outputs a control signal S85 to the motor 7 to wind or unwind the seat belt in response thereto.

When driver is asleep at the wheel, the alarm signal S93 is output to the controller 85. The controller 85 initiates output of a control signal S85 to the motor 7 to wind the seat belt 1 under the following conditions: the slack signal S13 is greater than a predetermined value indicating the seat belt 1 is relaxed and the buckle joint signal S14 is a logic "1" indicating the tongue plate 4a is inserted into the buckle 4. Upon receiving the control signal S85, the motor 7 rotates forward so that the driver's seat belt is wound-up into the seat belt winding device 2 by rotation of the shaft connected to a shaft of the motor 7. The controller 85 discontinues output of the control signal S85 when a signal S86 from the current detecting circuit 86 reaches a predetermined value indicating a predetermined torque (or load) of the motor 7. Consequently, the rotation of the motor 7 stops and the seat belt tightening operation stops. This seat belt tightening operation is strong enough to wake up the sleeping driver.

As clearly understood, the termination of the seat belt tightening operation can be effected by using the slack signal from the slack sensor 13 instead of the current signal S86, i.e., the controller 85 can discontinue output of the control signal S85 to the motor 7 when the slack signal reaches a predetermined tension level.

When the alarm signal S93 indicates a normal condition, the controller 85 outputs the control signal S85 to the motor 7 for a predetermined time to unwind the seat belt 1. This unwinding operation releases the driver from the tight constraint.

When the driver removes or loosens the seat belt, the seat belt is drawn from the seat belt winding device 2. Consequently, the motor shaft is reversely skidded. The negative emf sensor 87 detects this motion by the negative emf generated in the motor 7. When the negative emf exists at the output of the negative emf sensor 87, the controller 85 temporarily stops outputting the control signal S85 to the motor 7 to temporarily halt the tightening operation. Also, the controller 85 stops outputting the control signal S85 when the negative emf continuously exists over a predetermined period. Thus, the driver can loosen his seat belt, free from the seat belt tightening operation, so as to make himself more comfortable. The tightening operation restarts when the negative emf ends and the heart beat of the driver exceeds the alarm level.

Normally, the above-mentioned seat belt tightening and untightening operation is effected during automobile running. For this reason, a running signal, for example a signal from a speedometer, can be input to the controller 85 as an interlock signal. In addition, in order to improve the reliability of the seat belt tightening and untightening operation and to prevent unnecessary tightening and untightening operation due to the normal fluctuations of the heart beat and other signals, a desired time lag for each operation and dead band technique can be applied as in the conventional manner.

In the above-mentioned embodiment, the seat belt winding/unwinding means is a motor. However, the means is not limited thereto. For example, a set of strong and weak springs may be used instead of a motor in an electric tension-reducing seat belt. The strong spring is operated by a solenoid when the alarm signal indicates an attention, alarm, or emergency state, while the weak spring is operated when the alarm signal indicates a normal state.

As clearly understood, the seat belt system is not limited to automobiles and can find wide application for trains, aircraft, and the like. In addition, the seat belt system of the present invention can be applied to passenger seat belts as well. In such a case, the passengers' seat belts are tightened when, for example, the alarm signal indicates, for example, an attention, alarm, or emergency state from the heart beat of the driver or the automobile speed is too high and are untightened when the alarm signal indicates a normal state or the automobile speed is low.

We claim:
1. A seat belt system comprising:
 seat belt means including at least one seat belt and at least one seat belt drive device thereof;
 two electrodes;
 heart beat calculating means for receiving signals detected at the electrodes and calculating a heart beat in response to the signals from the electrodes; and
 a control circuit means for outputting a control signal to the seat belt drive device to wind or unwind the seat belt in response to the heart beat signal from the heart beat calculating means.

2. A seat belt system according to claim 1, wherein said two electrodes are mounted on a steering wheel of an automobile and are electrically isolated.

3. A seat belt system according to claim 1, wherein said system further comprises a buckle sensor for detecting insertion of a tongue plate connected to the seat belt into a buckle and a slack sensor detecting slack of the seat belt, the control circuit means outputting the control signal when a signal from the buckle sensor indicates insertion of the tongue plate into the buckle and a signal from the slack sensor indicates slack of the seat belt.

4. A seat belt system according to claim 1, wherein said seat belt means is an automatic reversible windup seat belt device including a reversible electric motor.

5. A seat belt system according to claim 1, wherein said seat belt means is an electric tension-reducing seat belt device including a strong spring and a weak spring as the seat belt drive device.

6. A seat belt system according to claim 1, wherein said system further includes a device having at least one of a visual display and/or at least one audio alarm, and the heart beat calculating means outputs an alarm signal to the device.

7. A seat belt system according to claim 1, wherein said system further includes a heart beat signal display receiving a heart beat signal from the heart beat calculating means.

8. A seat belt system according to claim 6, wherein said system further includes a heart beat signal display receiving a heart beat signal from the heart beat calculating means.

* * * * *